United States Patent [19]

Kawamura

[11] Patent Number: 4,998,951
[45] Date of Patent: Mar. 12, 1991

[54] TURBOCHARGER CONTROL SYSTEM

[75] Inventor: Hideo Kawamura, Samukawa, Japan

[73] Assignee: Isuzu Ceramics Research Institute Co., Ltd., Fujisawa, Japan

[21] Appl. No.: 390,222

[22] Filed: Aug. 7, 1989

[30] Foreign Application Priority Data

Aug. 5, 1988 [JP] Japan .................................. 63-195719

[51] Int. Cl.⁵ ........................ F02B 37/14; F02D 23/00
[52] U.S. Cl. .......................................... 60/608; 60/611
[58] Field of Search ........................ 60/607, 608, 64; 123/559.1, 564

[56] References Cited

U.S. PATENT DOCUMENTS 3,020,901 2/1962 Cook ................................. 123/559.1
4,901,530 2/1990 Kawamura ............................. 60/608

FOREIGN PATENT DOCUMENTS 113535 7/1983 Japan ..................................... 60/611
516835 6/1976 U.S.S.R. ................................. 60/611

Primary Examiner—Michael Koczo
Attorney, Agent, or Firm—Staas & Halsey

[57] ABSTRACT

A turbocharger control system includes an on-off valve disposed in an engine-side end of a passage interconnecting a turbocharger and an engine. When the accelerator pedal is released while the engine is in operation, the on-off valve is closed to store air under pressure in the passage. When the engine is accelerated again, the on-off valve is opened to supply the stored air to the engine, thus supercharging the engine. Therefore, any turbocharger time lag produced when the engine is accelerated again can be reduced. If the pressure of intake air stored in the passage is not increased, a motor mounted on the rotatable shaft of the turbocharger is energized to assist in rotating the turbocharger.

8 Claims, 1 Drawing Sheet

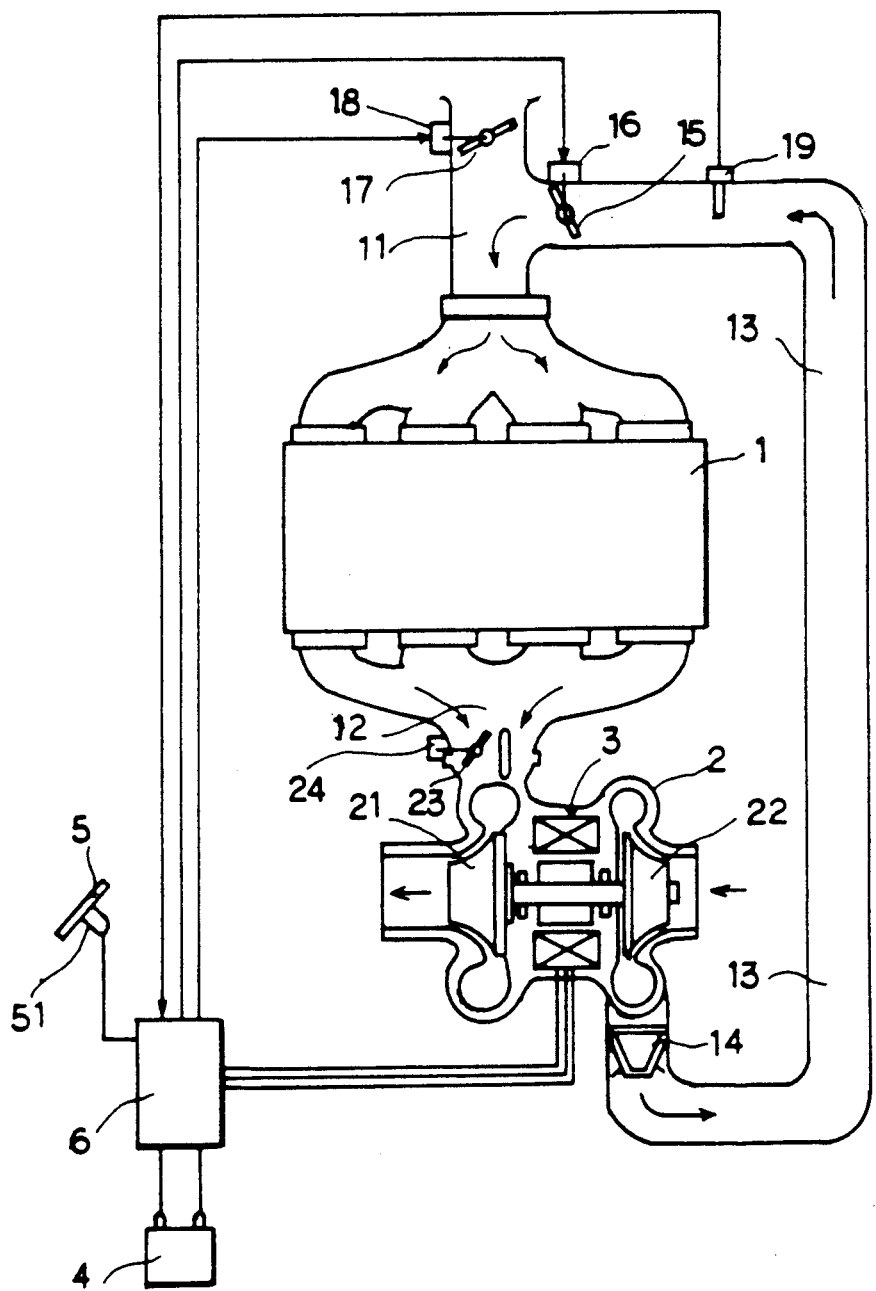

TURBOCHARGER CONTROL SYSTEM

BACKGROUND OF THE INVENTION

1. Field of the Invention

The present invention relates to a turbocharger control system for controlling a turbocharger including an electric motor mounted on a rotatable shaft which interconnects a turbine and a compressor, so that a motor vehicle incorporating the turbocharger can quickly be re-accelerated after the motor vehicle has been subjected to engine braking.

2. Description of the Prior Art

There are well known turbochargers which introduce exhaust gases from an engine to an exhaust turbine to rotate the turbine at a high speed, and pressurize intake air with a compressor directly coupled to the exhaust turbine for thereby supercharging the engine. Japanese Laid-Open Patent Publication No. 60-195329 discloses an apparatus in which a rotary electric machine is mounted on the rotatable shaft of such a turbocharger and operable as an electric motor or generator depending on the operating condition of the engine. At least when the engine operates at a low speed and under a high load, the rotary electric machine is operated as the motor or the generator to drive the compressor for supercharging the engine.

According to the disclosed apparatus, since the supercharging operation of the compressor is assisted by the rotary electric machine operating as the motor during the low-speed, high-load operation of the engine, the boost pressure is increased and the torque produced by the engine is increased.

However, when the engine needs to be accelerated quickly, even if the motor is energized to increase the boost pressure, the boost pressure cannot be increased as quickly as it is desired to accelerate the engine since the rotational parts such as the motor and the compressor have moments of inertia and it takes time to compress air.

SUMMARY OF THE INVENTION

In view of the aforesaid drawback of the conventional turbocharger control apparatus, it is an object of the present invention to provide a turbocharger control system including valves disposed respectively in the opposite ends of an intake passage which interconnects the compressor of a turbocharger and an engine, the valves being used to keep compressed air in the intake passage and to supply the compressed air quickly into the engine when the engine is to be re-accelerated.

According to the present invention, there is provided a system for controlling a turbocharger associated with an engine, comprising storing means for closing a passage interconnecting an air outlet of the turbocharger and an air inlet of the engine and storing intake air from the turbocharger, supply means for supplying intake air stored by the storing means into the engine, detecting means for detecting the amount of depression of an accelerator pedal which controls the output power of the engine, means for operating the storing means when it is determined based on a signal from the detecting means that the accelerator pedal is released at a speed higher than a predetermined speed, and means for operating the supply means when it is determined that the accelerator pedal is depressed when the storing means is operated.

The above and other objects, features and advantages of the present invention will become more apparent from the following description when taken in conjunction with the accompanying drawing in which a preferred embodiment of the present invention is shown by wa of illustrative example.

BRIEF DESCRIPTION OF THE DRAWING

The sole FIGURE is a schematic diagram, partly shown in block form, of a turbocharger control system according to the present invention.

DESCRIPTION OF THE PREFERRED EMBODIMENT

An engine 1 mounted on a motor vehicle (not shown) drives the motor vehicle with the combustion energy produced by burning a mixture of fuel and air which is introduced into the engine through an intake pipe 11. Exhaust gases from the engine 1 are supplied through an exhaust pipe 12 into a turbocharger 2 coupled to the engine 1. The exhaust pipe 12 is divided into two sections, one of which can be opened and closed by an exhaust pipe valve 23 disposed therein. The exhaust pipe valve 23 is opened and closed by a valve actuator 24. The turbocharger 2 has an exhaust turbine 21 and an intake compressor 22 coupled to the exhaust turbine 21 by a rotatable shaft thereof. The intake compressor 22 is rotated by the torque produced by the exhaust turbine 21 for compressing intake air. The intake compressor 22 has an outlet connected to the intake pipe 11 through an intake passage 13 for feeding air under pressure to the intake pipe 11 to supercharge the engine 1.

A reed valve 14 is disposed between the outlet of the compressor 22 and the intake passage 13. The reed valve 14 comprises a one-way valve capable of allowing air to flow freely from the compressor 22 into the intake passage 13, but is hermetically sealed against an air flow from the intake passage 13 toward the compressor 22. The reed valve 14 may be replaced with a butterfly valve which is openable and closable by an actuator.

A butterfly valve 15 is disposed in the terminal end of the intake passage 13, i.e., between the intake passage 13 and the intake pipe 11. The butterfly valve 15 is openable and closable by a valve actuator 16. A pressure sensor 19 for detecting the pressure inside the intake passage 13 is mounted in the intake passage 19.

The inlet end of the intake pipe 11 can be opened and closed by an intake pipe valve 17 which is openable and closable by a valve actuator 18.

A rotary electric machine 3 is mounted on the rotatable shaft by which the exhaust turbine 21 and the intake compressor 22 are directly coupled to each other. When electric power is supplied, the rotary electric machine 3 operates as an electric motor to drive the intake compressor 22 for assisting supercharging operation of the turbocharger 2. When rotated by the exhaust turbine 21, the rotary electric machine 3 operates as an electric generator to produce electric power.

Stored electric power is supplied from a battery 4 through a controller 6 to the rotary electric machine 3 to operate the rotary electric machine 3 as the motor.

An accelerator pedal 5 is associated with an accelerator pedal movement sensor 51 which serves as a means for detecting the amount of depression of the accelerator pedal 5. The accelerator pedal movement sensor 51 detects the movement of the accelerator pedal 5 depressed by the driver of the motor vehicle, and sends a signal indicative of the detected movement to the controller 6.

The controller 6 comprises a microcomputer including a central processing unit for effecting arithmetic operations, various memories for storing arithmetic and control procedures, and input/output ports, and a power converter for converting DC electric power from the battery 4 to AC electric power having a certain frequency. The controller is supplied with detected signals from the pressure sensor 19 and the accelerator pedal movement sensor 51, applies control signals to the valve actuators 16, 18, 24, and supplies AC electric power to the rotary electric machine 3.

Operation of the turbocharger control system thus constructed will be described below.

When the engine 1 operates under a low load, the intake valve 17 is opened and, at the same time, the butterfly valve 15 is closed as the rate of flow of exhaust gases from the engine 1 is low and the engine 1 is not supercharged by the compressor 22.

As the load on the engine 1 increases and the engine 1 can be supercharged by the compressor 22, the intake valve 17 is closed and the butterfly valve 15 is opened. Intake air compressed by the compressor 22 is supplied through the butterfly valve 15 into the engine 1.

If the accelerator pedal 5 is released while the motor vehicle is running at a speed higher than a predetermined speed stored in the controller, the accelerator pedal movement sensor 51 detects the release of the accelerator pedal 5. The controller 6 then determines that the motor vehicle is to be subjected to engine braking based on a signal from the accelerator pedal movement sensor 51.

When the controller 6 detects the engine braking operation, it supplies control signals to the valve actuators 16, 18, 24 to close the butterfly valve 15 and the exhaust pipe valve 23 and open the intake pipe valve 17. When the exhaust pipe valve 23 is closed, the resistance to the flow of exhaust gases is increased, thereby exerting engine braking to the motor vehicle.

The cross-sectional area of the flow passage through the exhaust pipe is now reduced, and the exhaust turbine 21 is driven by exhaust gases flowing at an increased speed. Air compressed by the intake compressor 22 is stored in the intake passage 13 between the closed butterfly valve 15 and the reed valve 14.

When the accelerator pedal 6 is depressed again to accelerate the motor vehicle, the controller 6 detects the depression of the accelerator pedal 6, and send control signals to close the intake pipe valve 17 and open the exhaust pipe valve 23. The controller 6 adjusts the opening of the butterfly valve 15 depending on the signals from the accelerator pedal movement sensor 51 and the pressure sensor 19. The intake air stored in the intake passage 13 is then supplied immediately to the engine 1.

The opening of the butterfly valve 15 is adjusted such that when the accelerator pedal 5 is depressed to a large extent, the butterfly valve 15 is fully opened, and when the accelerator pedal 5 is depressed to a small extent, the opening of the butterfly valve 15 is reduced. As the pressure indicated by the signal from the pressure sensor 19 is reduced, the controller 6 increases the opening of the butterfly valve 15.

If the energy of exhaust gases from the engine 1 is small upon the engine braking and the pressure in the intake passage 13 does not reach a predetermined pressure upon elapse of a certain period of time after the engine braking has been exerted, the DC electric power from the battery 4 is converted by the power converter in the controller 6 into AC electric power having a certain frequency which is then supplied to the rotary electric machine 3. The rotary electric machine 3 is then operated as the motor to rotate the intake compressor 22 so that sufficient air under pressure can be fed through the reed valve 14 and stored in the intake passage 13.

An accumulator 100 may be disposed in the intake passage 13, and pressurized air may be stored in the accumulator 100 when the motor vehicle is subjected to engine braking.

With the present invention, as described above, the butterfly valve and the reed valve for closing the intake passage are disposed respectively in the opposite ends of the intake passage by which the turbocharger and the intake pipe of the engine are interconnected. Intake air under pressure is stored in the closed intake passage by the energy of exhaust gases discharged from the engine when the motor vehicle undergoes engine braking. When the engine is accelerated again, the stored intake air under pressure is quickly supplied to the engine at a rate commensurate with the amount of depression of the accelerator pedal. Therefore, the engine can be accelerated quickly and its rotational speed can be increased quickly.

If the exhaust energy is small upon engine braking, the electric power from the battery is supplied to the rotary electric machine to drive the intake compressor. Accordingly, sufficient air under pressure can be stored in the intake passage to allow the engine to be accelerated highly quickly.

Although a certain preferred embodiment has been shown and described, it should be understood that many changes and modifications may be made therein without departing from the scope of the appended claims.

What is claimed is:

1. A system for controlling a turbocharger associated with an internal combustion engine, comprising:
   a passage interconnecting an air outlet of the turbocharger and an air inlet of the engine;
   opening and closing means, disposed in an end of the passage which is connected to said air inlet, for selectively opening and closing said end of the passage;
   detecting means for detecting the amount of depression of an accelerator pedal which controls the output power of the engine; and
   control means for controlling said opening and closing means to close said passage end to store intake air in said passage, when the amount of depression of said accelerator pedal is reduced at a speed higher than a predetermined speed as detected by a signal from said detecting means, and for controlling said opening and closing means to open said passage end to release the stored intake air and supply the stored intake air to the engine, when the amount of depression of said accelerator pedal is increased.

2. A system according to claim 1, further comprising means for increasing the amount of opening of said passage end provided by said opening and closing means as the amount of depression of the accelerator pedal is increased.

3. A system according to claim 2, further comprising detecting means for detecting the pressure of the intake air stored in said passage, and means for increasing the amount of opening of said passage end provided by said opening and closing means as the pressure of the stored intake air, as detected by said detecting means, is reduced.

4. A system according to claim 3, further comprising a rotary electric machine mounted on a rotatable shaft of the turbocharger, and means for operating said rotary electric machine as an electric motor, when the detected pressure of the stored intake air is lower than a predetermined pressure.

5. A system according to claim 1, further comprising opening means for venting the air inlet of the engine to atmosphere, and means for actuating said opening means to vent the air inlet to atmosphere, only when said passage end is closed by said opening and closing means.

6. A system according to claim 5, further comprising a reed valve disposed between the air outlet of the turbocharger and said passage for feeding intake air from the turbocharger only toward said passage.

7. A system according to claim 6, further comprising an accumulator connected to said passage.

8. A system according to claim 4, further comprising an opening means for venting the air inlet of the engine to atmosphere, and means for actuating said opening means to vent the air inlet to atmosphere, only when said passage end is closed by said opening and closing means.

* * * * *